United States Patent [19]
Bouvier et al.

[11] Patent Number: 5,530,946
[45] Date of Patent: Jun. 25, 1996

[54] PROCESSOR FAILURE DETECTION AND RECOVERY CIRCUIT IN A DUAL PROCESSOR COMPUTER SYSTEM AND METHOD OF OPERATION THEREOF

[75] Inventors: Daniel Bouvier; Wai-ming R. Chan, both of Austin, Tex.

[73] Assignee: Dell USA, L.P., Austin, Tex.

[21] Appl. No.: 330,883

[22] Filed: Oct. 28, 1994

[51] Int. Cl.⁶ ..................................................... G06F 11/00
[52] U.S. Cl. ................................. 395/182.21; 371/49.1; 395/182.11; 364/230.4; 364/230.6; 364/230; 364/268; 364/266.5; 364/DIG. 1
[58] Field of Search .............................. 395/575, 182.21, 395/182.11, 182.08; 371/8.1, 9.1; 364/285, 230.4, 230.6, 230, 266.5, 268, 268.9

[56] References Cited

U.S. PATENT DOCUMENTS

| | | | |
|---|---|---|---|
| 4,351,023 | 9/1982 | Richer | 371/9.1 |
| 4,757,442 | 7/1988 | Sakata | 371/47.1 |
| 4,872,106 | 10/1989 | Slater | 371/9.1 |
| 4,959,768 | 9/1990 | Gerhart | 371/9.1 |
| 5,041,966 | 8/1991 | Nakai et al. | 364/228.7 |
| 5,235,700 | 8/1993 | Alaiwan et al. | 395/575 |
| 5,276,823 | 1/1994 | Cutts, Jr. et al. | 395/575 |
| 5,295,258 | 3/1994 | Jewett et al. | 395/575 |

*Primary Examiner*—Robert W. Beausoliel, Jr.
*Assistant Examiner*—Dieu-Minh Le
*Attorney, Agent, or Firm*—Henry N. Garrana; Mark P. Kahler; Michelle M. Turner

[57] ABSTRACT

A dual processor computer system is disclosed that includes a processor failure detection and recovery circuit which initially designates one of the processing units as the lead-off master and the other processing unit as a slave. The processor failure detection and recovery circuit includes a timer unit which begins the countdown of a predetermined period in response to the initial resetting of the master and slave processors. The processor failure and detection circuit further includes a control unit which determines whether the master processor fails to reset or suffers from a hard failure by determining whether a bit of a storage unit has been set in response to software code intended for execution by the master processor during initialization. If the bit is not set before the lapse of the predetermined time period following reset, the control unit changes the designation of the slave processor to master and simultaneously resets the re-designated master. The control unit further holds the failed processing unit in an inactive state.

28 Claims, 4 Drawing Sheets

PROCESSOR FAILURE DETECTION AND RECOVERY CIRCUIT IN A DUAL PROCESSOR COMPUTER SYSTEM AND METHOD OF OPERATION THEREOF

BACKGROUND OF THE INVENTION

1. Field of the Invention

This invention relates to computer systems and more particularly to processor failure detection and recovery techniques employed within multi-processing computer systems.

2. Description of the Relevant Art

Computer systems which employ multiple processing units hold a promise of economically accommodating performance capabilities that surpass those of current single-processor based systems. Within a multi-processing environment, rather than concentrating all the processing for an application within a single processor, tasks are divided into groups or "threads" that can be individually handled by separate processors. The overall processing load may thus be distributed among several processors, and the distributed tasks may be executed simultaneously in parallel. The operating system software divides various portions of the program code into the separately executable threads, and typically assigns a priority level to each thread.

Figure 1:
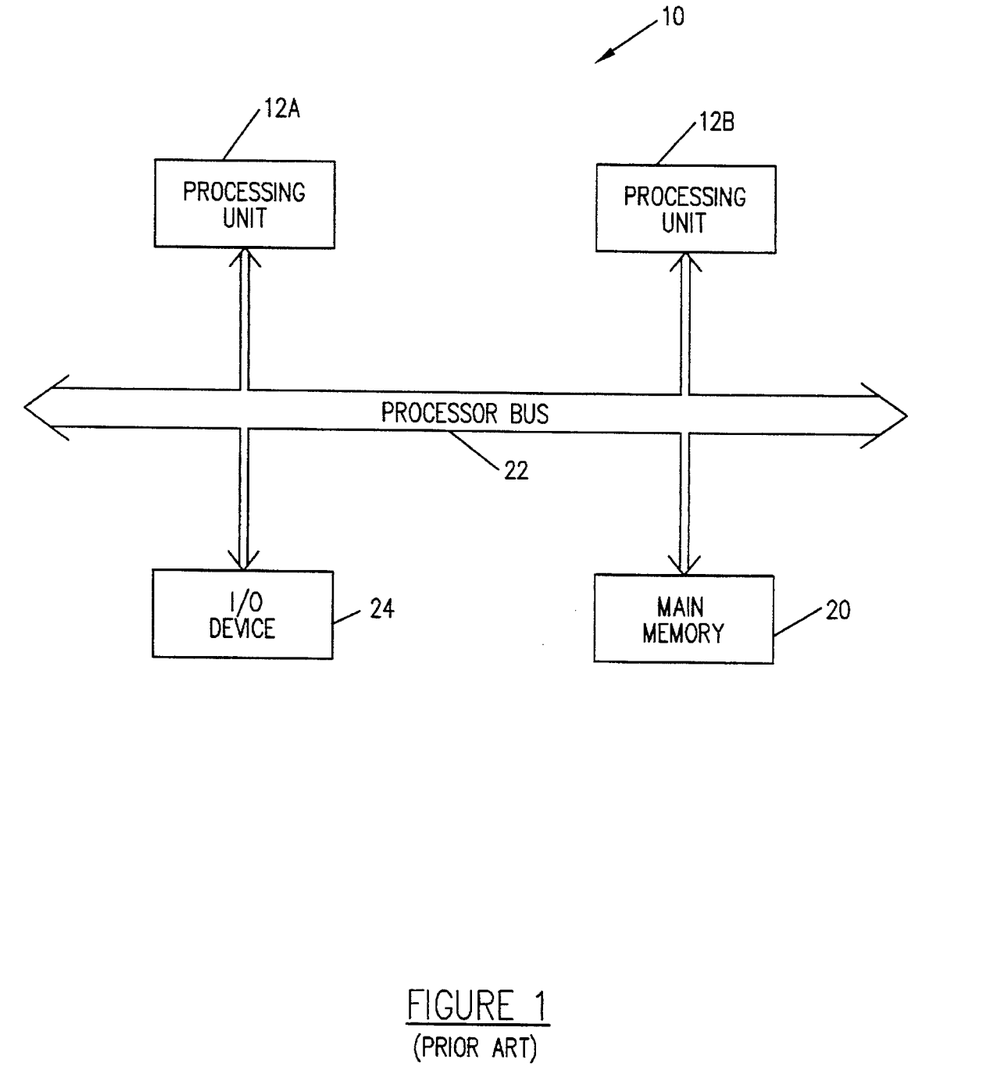
FIG. 1 is a block diagram of a symmetrical dual processing system including a pair of processing units.

FIG. 1 is a simplified block diagram of a so-called symmetrical dual processing system 10 including a pair of processing units 12A and 12B. Processing units 12A and 12B are each coupled to a main memory 20 via a processor bus 22. An I/O device 24 is further coupled to processor bus 22.

The multi-processing system 10 is symmetrical in the sense that both processing units 12A and 12B share the same memory space (i.e., such as main memory 20) and access memory space using the same address mapping. The multi-processing system 10 is further symmetrical in the sense that both processing units 12A and 12B share equal access to the same I/O subsystem.

In general, a single copy of the operating system software as well as a single copy of each user application file is stored within main memory 20. Each processing unit 12A and 12B executes from these single copies of the operating system and user application files. Although processing units 12A and 12B may be processing instructions simultaneously, it is noted that only one of the processing units 12A or 12B may assume mastership of the processor bus 22 at a given time. Thus, a bus arbitration mechanism (not shown) is typically provided to arbitrate concurrent bus requests of the processing units and to grant mastership to one of the processing units based upon a predetermined arbitration algorithm. A variety of bus arbitration techniques are well known. Each processing unit 12A and 12B is also typically associated with a dedicated internal cache memory subsystem, the operation and function of which are also well-known.

For the dual processing system of FIG. 1, one of the processing units 12A or 12B is designated as a lead-off master processor. The lead-off master processor is the first processor to execute code upon system reset, and is otherwise essentially identical to the other processor which is referred to as a slave processor. For dual processing systems based on Pentium model P54C microprocessors, the master is designated by a pin strapping option referred to as "CPUTYPE". Upon system reset, each processor detects the logic level applied at its respective CPUTYPE pin and responsively assumes operation as either master or slave depending upon the detected logic level. A low logic level invokes operation as master while a high logic level invokes operation as slave. The designated master processor thereafter executes code to begin initialization of the system. At a certain point in the initialization code, a wake-up call (i.e., an interrupt) is provided to the slave processor to thus initiate dual processing operations.

Within such a dual processing system, if the master processor fails to reset or experiences a hard failure during operation, the system may be incapable of resuming operation under control of the slave processor. Thus, the user is left with a dead system in such situations even though a perfectly functional slave processor may remain within the system. Although the system administrator could power down the system upon such failure, remove the faulty processor, and replace it with the functional processor from the slave socket, the functional processor could be damaged during handling. Furthermore, the system must be powered down while the system administrator responds to the problem.

Another solution to this problem employs a jumper block which may be used to select the master processor. If the system fails, the system administrator could remove the cover of the machine and move a selection jumper to interchange the designations of the slave and master processors. However, this solution still requires the attention of the system administrator to address the problem.

SUMMARY OF THE INVENTION

The problems outlined above are in large part solved by a processor failure detection and recovery circuit in a multi-processing computer system in accordance with the present invention. In one embodiment, a dual processor computer system is provided wherein a processor bus interconnects a pair of processing units. A processor failure detection and recovery circuit is coupled to each processing unit and includes a control unit which initially designates one of the processing units as the lead-off master processor and the other processing unit as the slave processor. This is accomplished by driving the CPUTYPE pin of the master processor low while driving the CPUTYPE pin of the slave processor high. The processor failure detection and recovery circuit additionally includes a timer unit coupled to the control unit which begins the countdown of a predetermined time period in response to the initial resetting of the master and slave processors. The processor failure and detection circuit advantageously determines whether the master processor fails to reset or suffers from a hard failure by determining whether a timer control bit of a register unit has been set in response to software code intended for execution by the master processor during initialization. In one specific implementation, following reset of the master processor and assuming proper operation thereof, a timer control bit of a register unit is set in response to a portion of the initialization code executed by the master processor. Since the timer control bit of the register unit is set before the timer unit completes its countdown of the predetermined time period, the control unit resets or turns off the timer, and no further responsive action is taken by the control unit. On the other hand, if the master processor fails to reset or suffers from a hard failure, the timer control bit of the status register unit will not be set since the initialization code is not executed. Thus, upon lapse of the predetermined time period following reset, the control unit changes the designation of the slave processor to master processor (i.e. by complementing the logic level at its associated CPUTYPE pin) and simultaneously resets both processing units. The control unit further holds the failed processing unit (which was the originally designated master) in an inactive state. The computer system thus restarts under control of only the re-designated master processor. The failed processing unit may be held in an inactive state, for example, by holding the failed processing unit in reset, by continuously "backing off" the failed processing unit, or by forcing the failed processing unit in a closed software loop relative to its internal cache memory.

The processor failure detection and recovery circuit may similarly be configured to change the designation of the slave processor to master and to reset the computer system in response to other detected errors. In one embodiment, the initialization code of the dual processing system may be structured to invoke self-test procedures (i.e., either in microcode and/or in subroutines of the initialization code). The particular formats of these self-test procedures may be chosen in accordance with the requirements of a particular system or user. If an error is detected by a self-test procedure, a second bit of the register unit referred to as the self-test error bit is set. The control unit monitors the self-test error bit of the register unit and, in response to the setting of the self-test error bit, re-designates the slave processor as master, resets the system, and holds the originally designated lead-off master processor in an inactive state. The control unit may be similarly configured to monitor an external error indicator pin of, for example, the lead-off master processor, and to re-designate the slave processor as master, reset the system, and hold the originally designated lead-off master processor in an inactive state if an error signal is asserted at the external error pin.

The control unit of the processor failure detection and recovery circuit may additionally cause the setting of yet another bit of the register unit when a failure in the originally designated master processor is detected, and the designation of the slave processor is changed to master. This third bit of the status register unit, referred to as the processor failure bit, may be read during subsequent initialization routines of the dual processing system and/or by a remote system to invoke a system warning such as a warning message on a display monitor. Alternatively, the control unit may be configured to generate an audible warning if a failure in the originally designated master is detected.

Broadly speaking, the present invention contemplates a processor failure detection and recovery circuit for a dual processing computer system. The dual processing computer system includes a first processing unit and a second processing unit each operatively coupled to a processor bus. The processor failure detection and recovery circuit comprises a timer unit capable of asserting a time-out signal indicative of a predetermined lapse of time following an initial reset of the first processing unit, and a control unit coupled to the timer unit and to the first and second processing units. The control unit is configured to provide a first control signal to the first processing unit to designate the first processing unit as a lead-off master processor, and is configured to provide a second control signal to the second processing unit to designate the second processing unit as a slave processor. A register unit is operatively coupled to the control unit wherein a first predetermined state of the register unit causes the control unit to re-designate the second processing unit as a master following an assertion of the time-out signal.

The present invention further contemplates a method for detecting and recovering from a processor failure within a multi-processing computer system. The multi-processing computer system includes a first processing unit coupled to a processor bus and a second processing unit coupled to the processor bus. The method comprises the steps of designating the first processing unit as a master processor, designating the second processing unit as a slave, and resetting said first processing unit. The method further comprises the steps of waiting a predetermined time period, detecting a state of a first bit storage location of a control register, and re-designating the second processing unit as a master depending upon the state of the first bit storage location.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
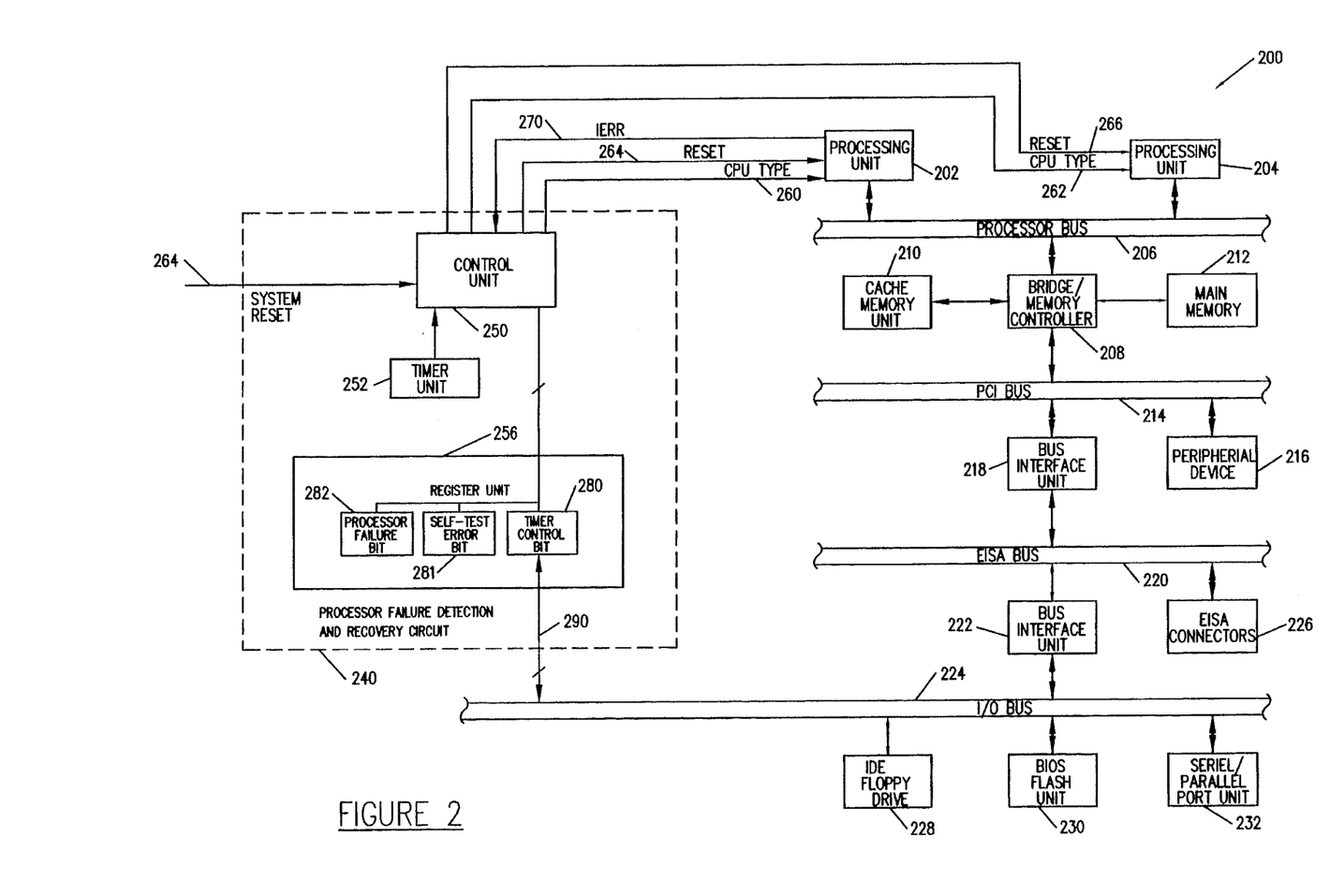
FIG. 2 is a block diagram of a computer system including a processor failure detection and recovery circuit in accordance with one embodiment of the present invention.

Turning now to FIG. 2, a block diagram of a computer system 200 including a processor failure detection and recovery circuit in accordance with one embodiment of the present invention is shown. The computer system 200 includes a processing unit 202 and a processing unit 204 operatively coupled to a processor bus 206. A bridge/memory controller 208 is connected to processor bus 206, to a cache memory unit 210, to a main memory 212, and to a PCI (Peripheral Component Interconnect) bus 214. A peripheral device 216 is further shown coupled to PCI bus 214. A bus interface unit 218 operatively couples PCI bus 214 to an EISA (Extended Industry Standard Architecture) bus 220. An additional bus interface unit 222 operatively couples EISA bus 220 to an I/O bus 224. A circuit block labeled EISA connectors 226 depicts a set of expansion slots provided within computer system 200 to accommodate various EISA peripheral cards. An IDE (Integrated Drive Electronics) floppy drive 228, a BIOS flash unit 230, and a serial/parallel port unit 232 are further shown connected to I/O bus 224.

A processor failure detection and recovery circuit 240 is also shown coupled to processing units 202 and 204. The processor failure and detection circuit 240 includes a control unit 250 coupled to processing units 202 and 204, and a timer unit 252 coupled to control unit 250. A register unit 256 is further shown coupled to control unit 250 as well as to I/O bus 224. The operation of the processor failure detection and recovery circuit 240 will be described in greater detail below.

In its illustrated form, computer system 200 embodies a symmetrical dual processing architecture. It is understood, however, that the present invention may be adapted to symmetrical multi-processing systems including more than two processing units. Furthermore, although a single secondary cache memory unit 210 is shown coupled to processing units 202 and 204 via processor bus 206 and bridge/memory controller 208, it is understood that the present invention may be adapted to systems with multiple secondary cache memory units. It is further understood that a variety of additional or alternative devices may be coupled to processor bus 206, PCI bus 214, EISA bus 220, and/or I/O bus 224. For example, it is noted that a bus arbiter unit and/or a programmable interrupt controller may be coupled to processor bus 206.

Processor bus 206 may be any suitable bus for interconnecting processing units 202 and 204. Furthermore, although the computer system 200 includes several specific standard-configuration buses including PCI bus 214 and EISA bus 220, alternative bus standards could be employed.

Processing units 202 and 204 are data processing units that implement a predetermined instruction set. An exemplary processing unit is the Pentium model P54C processing unit. It is noted that the Pentium model P54C processing unit includes an internal cache memory subsystem.

Bridge/memory controller 208 orchestrates the transfer of control, address, and data signals between processor bus 206 and PCI bus 214. Bridge/memory controller 208 further manages the transfer of data to and from cache memory unit 210 and main memory unit 212.

Bus interface unit 218 orchestrates the transfer of control, address, and data signals between PCI bus 214 and EISA bus 220, and bus interface unit 222 similarly orchestrates the transfer of control, address and data signals between EISA bus 220 and I/O bus 224. Various implementations of bus interface units 218 and 222, as well as implementations of bridge/memory controller 208 are well known.

Peripheral device 216 is illustrative of a variety of peripheral devices. Exemplary devices include CD ROM units and local area network devices.

During initial operation of computer system 200, processing unit 202 is designated as the lead-off master processor while processing unit 204 is designated as a slave processor. Generally speaking, processor failure detection and recovery circuit 240 is provided to detect certain failures which may be associated with the designated lead-off master processor, and to change the designation of the slave processor to master and to reset the system in the event that a failure in the originally designated lead-off master is detected. Failure detection and recovery circuit 240 further includes a mechanism to support a user warning in the event a failure in the originally designated master processor is detected. Specific details follow.

Control unit 250 controls which of the processing units 202 or 204 is initially designated as the lead-off master processor, and which is designated as the slave. For this purpose, lines 260 and 262 are coupled to the CPUTYPE pins of processing units 202 and 204, respectively. In the illustrated embodiment, processing unit 202 is designated as the lead-off master by driving its associated CPUTYPE pin low, while processing unit 204 is designated as a slave by driving its associated CPUTYPE pin high. The signals driven at lines 260 and 262 are referred to herein as CPUTYPE signals.

When computer system 200 is initially powered on or is reset via a system reset signal at line 264, control unit 250 drives the CPUTYPE signal at line 260 (to processing unit 202) low while driving the CPUTYPE signal at line 262 (to processing unit 204) high. Control unit 250 simultaneously resets both processing units 202 and 204 by asserting reset pulses at lines 264 and 266, respectively. This causes processing unit 202 to begin execution of code as the lead-off master, and causes processing unit 204 to assume operation as a slave.

Following reset, if processing unit 202 is operating properly, processing unit 202 will begin the execution of initialization code. This code is typically stored within BIOS flash unit 230, which is composed of non-volatile memory. It is noted that portions of this code may be shadowed within main memory 212. As will be appreciated by those of skill in the art, a purpose of this initialization code is to initialize various operational parameters associated with computer system 200 and to configure the dual processing channels. During this portion of the initialization sequence, the slave processing unit 204 remains idle. Upon completion of initialization by the lead-off processing unit 202, an interrupt is provided to processing unit 204 which causes the slave to begin code execution. Dual processing operations may thereafter proceed in a conventional manner.

As stated previously, the processor failure detection and recovery circuit 240 of FIG. 2 is provided to detect the occurrence of failures which may be associated with the lead-off master processing unit 202 and to re-designate the slave processing unit 204 as the master in the event a failure is detected. Several different types of failure may be associated with or caused by processing unit 202. A first type of failure occurs when processing unit 202 fails to reset or fails to execute any code. Another type of failure is detected through a self-test routine invoked by either a microcode instruction or a procedure associated with the initialization code (i.e., the bootstrap code). A third type of failure is detected by an internal error detection circuit of processing unit 202, and is indicated by the assertion of a signal labeled IERR (internal error) at line 270. Similar error detection circuitry may also be associated with processing unit 204. Specific details regarding the detection of each of these types of failures are discussed next, as well as the response of failure detection and recovery circuit 240 to each detected failure.

Register unit 256 includes a bit storage location labelled "timer control bit" 280, a second bit storage location labelled "self-test error bit" 281, and a third bit storage location labeled "processor failure bit" 282. As will be explained in further detail below, the timer control bit 280 may be set during the execution of initialization routines executed by the lead-off master processing unit 202. If the processing unit 202 fails to reset or experiences a hard failure, the timer control bit 280 will not be set. The self-test error bit 281 is set if a failure is detected by a microcode or initialization self-test routine. Finally, the processor failure bit 282 is set by control unit 250 if a failure in the lead-off master processor (i.e., processing unit 202) is detected. It is noted that the bits 280–282 of status register unit 256 may be mapped within either the I/O space or the memory space of computer system 200. It is further noted that while bits 280–282 are depicted within a common register unit 256, each bit 280–282 may be separately mapped and/or may be portions of different physical registers.

Figure 3:
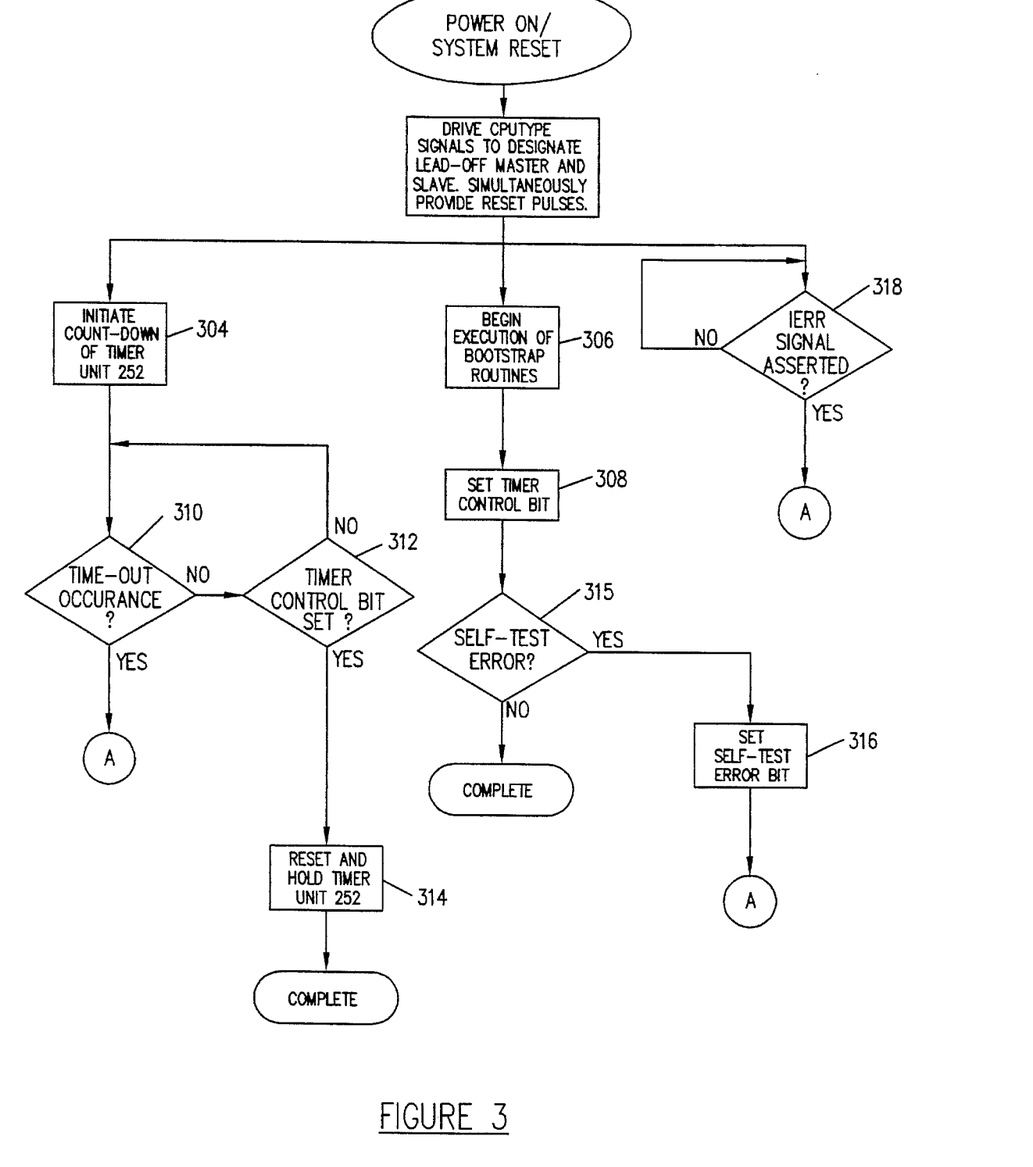
FIGS. 3 and 4 are flow diagrams that depict an operation of the computer system of FIG. 2.
Figure 4:
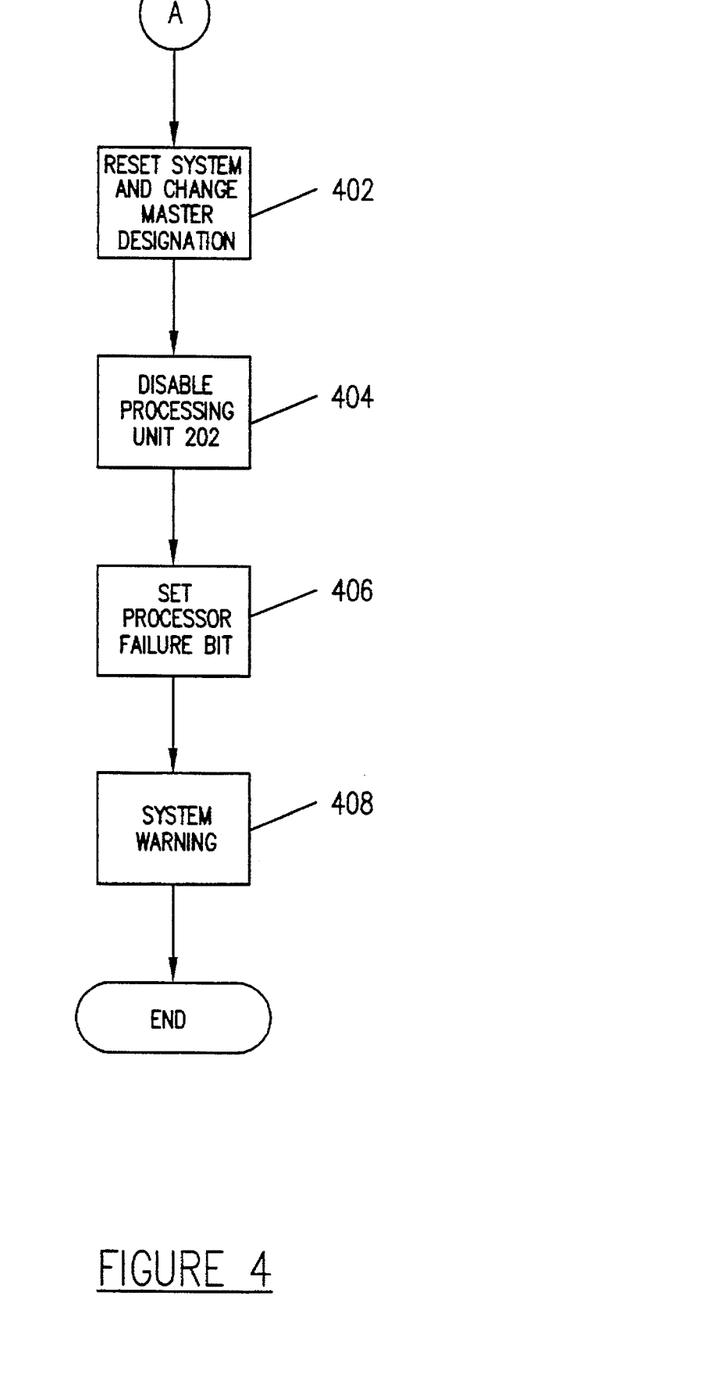

FIGS. 3 and 4 are flow diagrams which depict various aspects of the operation of computer system 200. Referring to FIGS. 3 and 4 in conjunction with FIG. 2, when computer system 200 is powered on and/or the system is reset, control unit 250 drives the CPUTYPE pin of processing unit 202 low and drives the CPUTYPE pin of processing unit 204 high. As stated previously, this causes the processing unit 202 to assume operation as the designated lead-off master processor and the processing unit 204 to assume operation as the slave processor. Control unit 250 simultaneously provides respective reset pulses to processing units 202 and 204 via lines 264 and 266. This operation is depicted by step 302 of FIG. 3.

As illustrated by step 304 of FIG. 3, immediately after (or concurrently therewith) control unit 250 causes processing units 202 and 204 to reset, control unit 250 causes timer 252 to begin the countdown of a predetermined period of time. In one embodiment, this countdown period is set to approximately 500 milliseconds. Subsequent operations depend upon whether the timer control bit 280 is set within the predetermined period of time, as explained below.

Following reset, processing unit 202 begins execution of the bootstrap or other initialization routines which initialize computer system 200 as depicted by step 306. It is noted that execution of these initialization routines will occur only if the processing unit 202 has reset successfully and is actually executing code. During step 308, an instruction embedded within the initialization code is executed by processing unit 202 which causes the timer control bit 280 of register unit 256 to be set. This may be accomplished by, for example, execution of a basic I/O or memory write operation.

Referring to steps 310 and 312 of FIG. 3, if the timer control bit 280 of register unit 256 is not set during step 308, eventually the countdown period of timer unit 252 will elapse. The lapse of the countdown period causes timer unit 252 to assert a time-out signal which is received by control unit 250. Occurrence of this indicates a failure in the proper execution of code by processing unit 202. Thus, if the countdown period elapses and the timer control bit 280 is not set, control unit 250 causes the system to be reset again by asserting reset signals at lines 264 and 266, while simultaneously complementing the CPUTYPE signal at line 262 to thereby designate processing unit 204 as the master processor, as depicted by step 402 of FIG. 4. Control unit 250 further disables processing unit 202 during step 404. In a preferred embodiment, processing unit 202 is disabled by control unit 250 by holding processing unit 202 in a reset state (i.e. by continuously driving its reset pin high). It is noted that other techniques to effectively disable processing unit 202 may be alternatively employed, such as by continuously asserting an arbitration back-off signal to processing unit 202, or by causing processing unit 202 to execute in a closed loop whereby it continuously executes code out of its own internal cache (if it is, in fact, executing code).

Control unit 250 further sets the processor failure bit 282 of register unit 256 during step 406 to thereby indicate that a processor failure was detected and that processing unit 202 has been disabled. Subsequently, when the re-designated master (i.e., processing unit 204) executes the initialization code, the set status of the processor failure bit 282 may be used to trigger a system warning during step 408. For example, a warning such as a display on the computer system's monitor (not shown) may be triggered if the processor failure bit 282 is set. Alternatively, a remote network may be coupled to read the processor failure bit 282 of register unit 256 to thereby determine that a processor failure occurred. It is noted that an audible warning could also be triggered by control unit 250 upon detection of a processor failure.

Referring back again to steps 310 and 312 of FIG. 3, if the timer control bit 280 of register unit 256 is set during step 308 before the count-down period determined by timer unit 252 lapses, control unit resets and holds timer unit inactive during step 314. No further responsive action is taken by control unit 250 with regard to this aspect of the operation of computer system 200. It will be appreciated that control unit 250 could alternatively turn off timer unit 252 or could ignore the time-out signal generated by timer unit 252 in response to the timely setting of timer control bit 280.

A self-test routine may also be included as a portion of the initialization routines and or a microcode self-test instruction may be embedded within the initialization routines initiated during step 306. If an error is detected during such a self-test routine or microcode instruction as determined during step 315, the self-test error bit 281 of register unit 256 is set during step 316. If no such error is detected, control unit 250 takes no further action relative to this aspect of the operation of computer system 200.

Control unit 250 monitors the self-test error bit 281. If the self-test error bit 281 is set during step 316, control unit 250 responds in a manner which is identical that described previously with respect to the occurrence of an assertion of the time-out signal by timer unit 252. That is, if the self-test error bit 281 is set, control unit 250 causes the system to be reset again by asserting reset signals at lines 264 and 266, while simultaneously complementing the CPUTYPE signal at line 262 to thereby designate processing unit 204 as the master processor, as depicted by step 402 of FIG. 4. Control unit 250 further disables processing unit 202 during step 404 by holding processing unit 202 in a reset state (i.e. by continuously driving its reset pin high). Control unit 250 further sets the processor failure bit 282 of register unit 256 during step 406 to thereby indicate that a processor failure was detected and that processing unit 202 has been disabled. Subsequently, when the re-designated master (i.e., processing unit 204) executes the initialization code, the set status of the processor failure bit 282 may be used to trigger a system warning during step 408.

Referring again to FIG. 3, a similar operation occurs if the internal error signal IERR of processing unit 202 is asserted as determined during step 318. As stated previously, the internal error signal IERR may be asserted by internal error detection circuitry of processing unit 202. If control unit 250 detects assertion of the internal error signal IERR, the system is again reset by control unit 250 and the lead-off master designation is changed to processing unit 204 during step 402 in a manner identical to that described above. During step 404, processing unit 202 is disabled. During step 406, the processor failure bit 282 is set, and during step 408 a system warning is triggered.

It is noted that since register unit 256 includes a port 290 coupled to I/O bus 224, the register unit 256 does not impose a load upon the processor bus 206, the PCI bus 214, or the EISA bus 220, each of which should preferably support high bandwidth operations. It is also noted, however, that if the resultant loading does not unduly limit overall bandwidth, register unit 256 or any portion thereof (i.e., any one or more of the bit storage locations forming bits 280–282) may alternatively be coupled directly to either the processor bus 206, the PCI bus 214, or the EISA bus 220 without departing from the spirit and scope of the present invention. Similarly, PCI bus 214, EISA bus 220, and/or I/O bus 224 could be omitted.

Processor failure detection and recovery circuit 240 may additionally include control circuitry to monitor whether the processing unit 204 experiences a failure (i.e., after processing unit 204 has been re-designated as master). For this purpose, control unit 250 may monitor an internal error pin of processing unit 204, or may monitor the timer control bit 280 and the self-test error bit 281 in the same manner that failures of processing unit 202 are detected. A processor failure bit may additionally be set by the control unit 250 if an error in processing unit 204 is detected to thereby allow detection by a remote unit or to invoke an audible system warning.

Numerous variations and modifications will become apparent to those of skill in the art once the above disclosure is fully appreciated. For example, other specific control signals (i.e., in the place of the "CPUTYPE" signals) may be employed to designate the master and the slave processors. Similarly, although it will be appreciated that timer unit 252 could be embodied by a digital counter, other specific implementations are contemplated, such as an RC-based timing circuit. It is intended that the following claims be interpreted to embrace all such variations and modifications.

What is claimed is:

1. A multi-processing computer system comprising:
   a first processing unit including a first control terminal for receiving a first control signal to designate said first processing unit as either a master processor or a slave processor;
   a second processing unit including a second control terminal for receiving a second control signal to designate said second processing unit as either a master processor or a slave processor; and
   a processor failure detection and recovery circuit coupled to said first and second processing units, said processor failure detection and recovery circuit including:
   a storage unit having at least a first storage location;
   a control unit coupled to said storage unit and to said first and second control terminals, wherein said control unit is configured to generate said first and second control signals such that said first processing unit is designated as a lead-off master processor and said second processing unit is designated as a slave, and wherein said control unit is configured to control a reset operation of said first; and
   a timer unit operatively coupled to said control unit wherein said timer unit is configured to assert a time-out signal indicative of a predetermined lapse of time following said reset operation of said first processing unit;
   wherein said control unit is further configured to vary said second control signal to thereby re-designate said second processing unit as a master in response to an assertion of said time-out signal by said timer unit if a content stored within said first storage location of said storage unit is not changed following said reset operation of said first processing unit.

2. The multi-processing computer system as recited in claim 1 wherein said content of said first storage location includes a first bit and wherein said control unit is configured to re-designate said second processing unit as said master in response to said assertion of said time-out signal if said first bit of said first storage location of said storage unit is not set following said reset operation of said first processing unit.

3. The multi-processing computer system as recited in claim 1 wherein said first storage location of said storage unit is configured to store a new content in response to an instruction executed by said first processing unit.

4. The multi-processing computer system as recited in claim 1 wherein said control unit is further configured to disable said first processing unit when said second processing unit is re-designated as said master.

5. The multi-processing computer system as recited in claim 4 wherein said control unit is configured to hold said first processing in a reset state when said second processing unit is re-designated as said master.

6. The multi-processing computer system as recited in claim 2 wherein said control unit is configured to detect said first bit of said first storage location of said storage unit and to disable said timer unit if said first bit is set.

7. The multi-processing computer system as recited in claim 2 wherein said control unit is configured to detect said first bit of said first storage location of said storage unit and to disable a response of said control unit to said time-out signal if said first bit is set, whereby said control unit does not re-designate said second processing unit as said master if said first bit is set.

8. The multi-processing computer system as recited in claim 1 further comprising:
   a processor bus coupled to said first processing unit;
   a secondary bus coupled to said storage unit; and
   a bus interface unit coupled to said secondary bus, whereby said processor bus, said bus interface unit, and said secondary bus are interconnected to accommodate a transfer of data from said first processing unit to said storage unit.

9. The multi-processing computer system as recited in claim 1 wherein said control unit is further configured to assert a reset pulse to said second processing unit while re-designating said second processing unit as said master in response to said assertion of said time-out signal.

10. The multi-processing computer system as recited in claim 1 wherein said storage unit further includes a second storage location, and wherein said control unit is configured to re-designate said second processing unit as said master in response to a predetermined content stored within said second storage location.

11. The multi-processing computer system as recited in claim 10 wherein said second storage location of said storage unit is configured to store said predetermined content in response to an instruction executed by said first processing unit.

12. The multi-processing computer system as recited in claim 1 wherein said control unit is configured to invoke a system warning in response to said assertion of said time-out signal.

13. The multi-processing computer system as recited in claim 1 wherein said storage unit includes a third storage location having a state which is indicative of whether said control unit has re-designated said second processing unit as said master.

14. The multi-processing computer system as recited in claim 1 wherein said control unit is further configured to detect an error signal provided at an external pin of said first processing unit, and wherein said control unit is configured to re-designate said second processing unit as said master upon assertion of said error signal.

15. A processor failure detection and recovery circuit for a dual processing computer system, said dual processing computer system including a first processing unit and a second processing unit each operatively coupled to a processor bus, said processor failure detection and recovery circuit comprising:
   a timer unit configured to assert a time-out signal indicative of a predetermined lapse of time following an initial reset of said first processing unit;
   a control unit coupled to said timer unit and to said first and second processing units, wherein said control unit is configured to generate a first control signal to said first processing unit to designate said first processing unit as a lead-off master processor, and is configured to generate a second control signal to said second processing unit to designate said second processing unit as a slave processor; and a storage unit coupled to said control unit, wherein said control unit is configured to vary said second control signal to thereby re-designate said second processing unit as a master in response to an assertion of said time-out signal if a first predetermined content is stored within said storage unit.

16. The processor failure detection and recovery circuit as recited in claim 13 wherein said control unit is configured to re-designate said second processing unit as said master if a bit of said storage unit is not set before an assertion of said time-out signal.

17. The processor failure detection and recovery circuit as recited in claim 15 wherein said control unit is configured to inhibit a re-designation of said second processing unit as said master if a second predetermined content is stored within said storage unit before said assertion of said time-out signal.

18. The processor failure detection and recovery circuit as recited in claim 15 wherein said control unit is further configured to detect an error signal provided at an external pin of said first processing unit, and wherein said control unit is configured to re-designate said second processing unit as said master upon assertion of said error signal.

19. The processor failure detection and recovery circuit as recited in claim 15 wherein said control unit is further configured to invoke a system warning in response to a re-designation of said second processing unit to said master.

20. The processor failure detection and recovery circuit as recited in claim 15 wherein said control unit is configured to invoke said initial reset of said first processing unit.

21. A method for detecting and recovering from a processor failure within a multi-processing computer system, said multi-processing computer system including a first processing unit coupled to a processor bus and a second processing unit coupled to said processor bus, said method comprising:

a control unit designating said first processing unit as a master processor by providing a first control signal to said first processing unit;

said control unit designating said second processing unit as a slave by providing a second control signal to said second processing unit;

said control unit resetting said first processing unit;

said control unit waiting a predetermined time period;

said control unit detecting a content of a first storage location of a storage unit after waiting said predetermined time period; and said control unit re-designating said second processing unit as a master by varying said second control signal depending upon said content of said first storage location.

22. The method for detecting and recovering from a processor failure within a multi-processing computer system as recited in claim 21 further comprising said control unit resetting said second processing unit.

23. The method for detecting and recovering from a processor failure within a multi-processing computer system as recited in claim 21 wherein said designating said first processing unit, designating said second processing unit, and resetting said first processing unit are performed simultaneously.

24. The method for detecting and recovering from a processor failure within a multi-processing computer system as recited in claim 21 wherein said resetting said second processing unit is performed simultaneously with said re-designating said second processing unit as said master.

25. The method for detecting and recovering from a processor failure within a multi-processing computer system as recited in claim 21 wherein said re-designating said second processing unit as said master is performed if a predetermined content exists within said first storage location when said predetermined time period elapses.

26. The method for detecting and recovering from a processor failure within a multi-processing computer system as recited in claim 21 further comprising providing a system warning if said second processing unit is re-designated as said master.

27. The method for detecting and recovering from a processor failure within a multi-processing computer system as recited in claim 21 further comprising:

said control unit detecting an error signal provided at an external pin of said first processing unit; and said control unit re-designating said second processing unit as said master if said error signal is asserted.

28. The method for detecting and recovering from a processor failure within a multi-processing computer system as recited in claim 21 further comprising setting a bit of a second storage location if said second processing unit is re-designated as said master.

* * * * *